No. 886,229.
PATENTED APR. 28, 1908.
B. G. MEASE.
APPARATUS FOR TIPPING SEED CORN.
APPLICATION FILED DEC. 20, 1907.
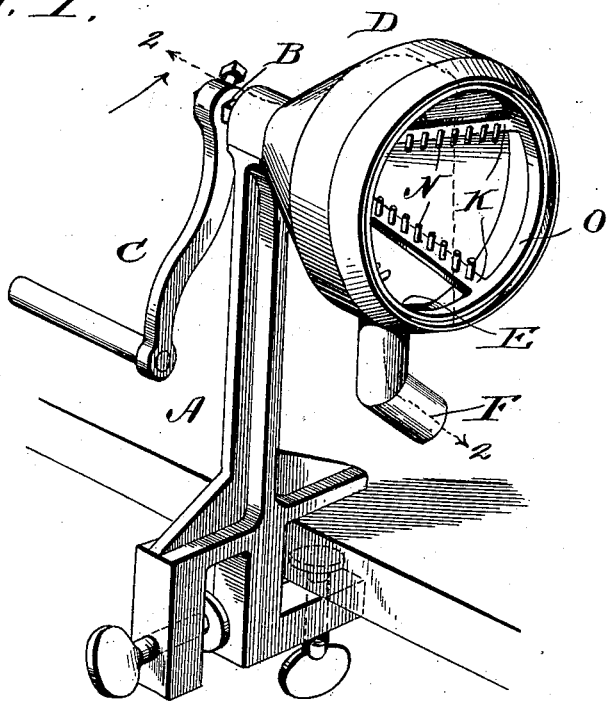
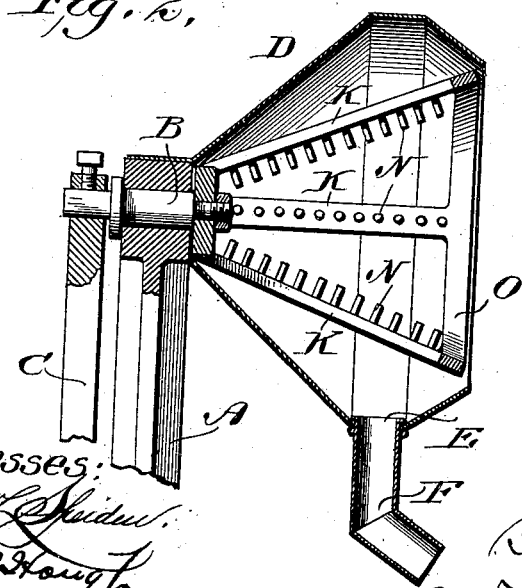
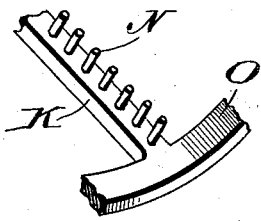

UNITED STATES PATENT OFFICE.

BENJAMIN GARFIELD MEASE, OF VINTON, IOWA.

APPARATUS FOR TIPPING SEED-CORN.

No. 886,229.        Specification of Letters Patent.        Patented April 28, 1908.

Application filed December 20, 1907. Serial No. 407,309.

*To all whom it may concern:*

Be it known that I, BENJAMIN G. MEASE, a citizen of the United States, residing at Vinton, in the county of Benton and State of Iowa, have invented certain new and useful Improvements in Apparatus for Tipping Seed-Corn; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for tipping seed corn and the object in view is to produce a simple and efficient means whereby the imperfect and irregular kernels of corn which are not fully developed at the ends of cobs may be separated from the cob before the corn for seed is shelled therefrom.

My invention comprises various details of construction and combinations and arrangements of parts which will be hereinafter fully described and then specifically defined in the appended claims.

I illustrate my invention in the accompanying drawings, in which:—

Figure 1 is a perspective view showing my invention as applied to a shelf. Fig. 2 is a sectional view through the apparatus on line 2—2 of Fig. 1 and Fig. 3 is a detailed view of a part of the device containing the kernel removing arms.

Reference now being had to the details of the drawings by letter, A designates a bracket arm which may be made of any material and is adapted to be fastened by means of a clamp screw or otherwise to a shelf, edge of a box or other device. B designates a stub shaft which is mounted in said bracket arm and C is a crank fixed to said shaft forming means whereby the latter may be rotated. A suitable casing D, preferably of conical shape, is fitted to the end of the bracket arm in which said shaft is pivoted and the lower portion of the casing is of cylindrical form and has an opening E therein to which an exit spout F is connected, whereby the imperfect or undeveloped kernels removed from the cob may pass. Fixed to the end of said stub shaft are the flaring arms K, having upon their inner faces teeth N projecting therefrom said teeth having blunt ends and spaced apart as shown. To the ends of said arms a ring O is fastened, thereby securely bracing the arms and holding the same spaced apart.

The operation of my invention is as follows:—When it is desired to remove the imperfectly developed or defective kernels commonly found upon the tip of the cob, the operator inserts the tip of the cob between the arms with teeth thereon and holds the butt end of the cob securely. The rotation of the arms by turning the crank will cause the kernels at the tip of the cob to be loosened therefrom and falling down will pass through the exit tube and be conveyed to any suitable location. The imperfect kernels being removed, the fully developed kernels suitable for seed remain upon the cob and may afterwards be removed by any suitable sheller. If imperfect kernels appear upon the opposite ends of the cobs, the latter may be inverted and removed by inserting the same within the apparatus and turning the crank in the same manner as described.

From the foregoing, it will be noted that, by the provision of an apparatus as shown and described, a simple and efficient means is afforded whereby the imperfect kernels may be readily removed from the cob before the fully developed kernel is removed, thereby affording a seed for the most perfect germination possible.

What I claim to be new is:—

1. An apparatus for tipping seed corn comprising a bracket arm, a shaft journaled therein, means for rotating the shaft, a conical-shaped casing mounted upon said arm, a series of radially disposed arms fixed to said shaft and divergently disposed to describe a cone, and a series of teeth in alinement with one another mounted upon each of said arms, as set forth.

2. An apparatus for tipping seed corn comprising a bracket arm, a shaft journaled therein, means for rotating the shaft, a series of radially disposed arms fixed to said shaft and divergently disposed to describe a cone, a series of teeth in alinement with one another mounted upon each of said arms, a conical-shaped casing fixed to said arm and surrounding said arms, the outer end of said casing being contracted to a narrow cylindrical portion near the edge and an inwardly projecting conical rim at the edge, and an exit tube leading from said cylindrical portion of the casing, as set forth.

3. An apparatus for tipping seed corn comprising a bracket arm, a shouldered shaft journaled therein, means for operating said shaft, a disk mounted upon a contracted end of said shaft, a nut adapted to hold said disk against the shoulder of the shaft, arms projecting from said disk and divergently disposed to describe a cone, a series of teeth arranged in alinement with one another upon each of said arms upon the disk, and a ring connecting the outer ends of the arms, as set forth.

In testimony whereof I hereunto affix my signature in the presence of two witnesses.

BEJ. GARFIELD MEASE.

Witnesses:
   E. M. TINKHAM,
   F. T. PRIMUS.